(No Model.)
W. W. GRISCOM.
MANUFACTURE OF SECONDARY BATTERY ELECTRODES.
No. 487,834. Patented Dec. 13, 1892.
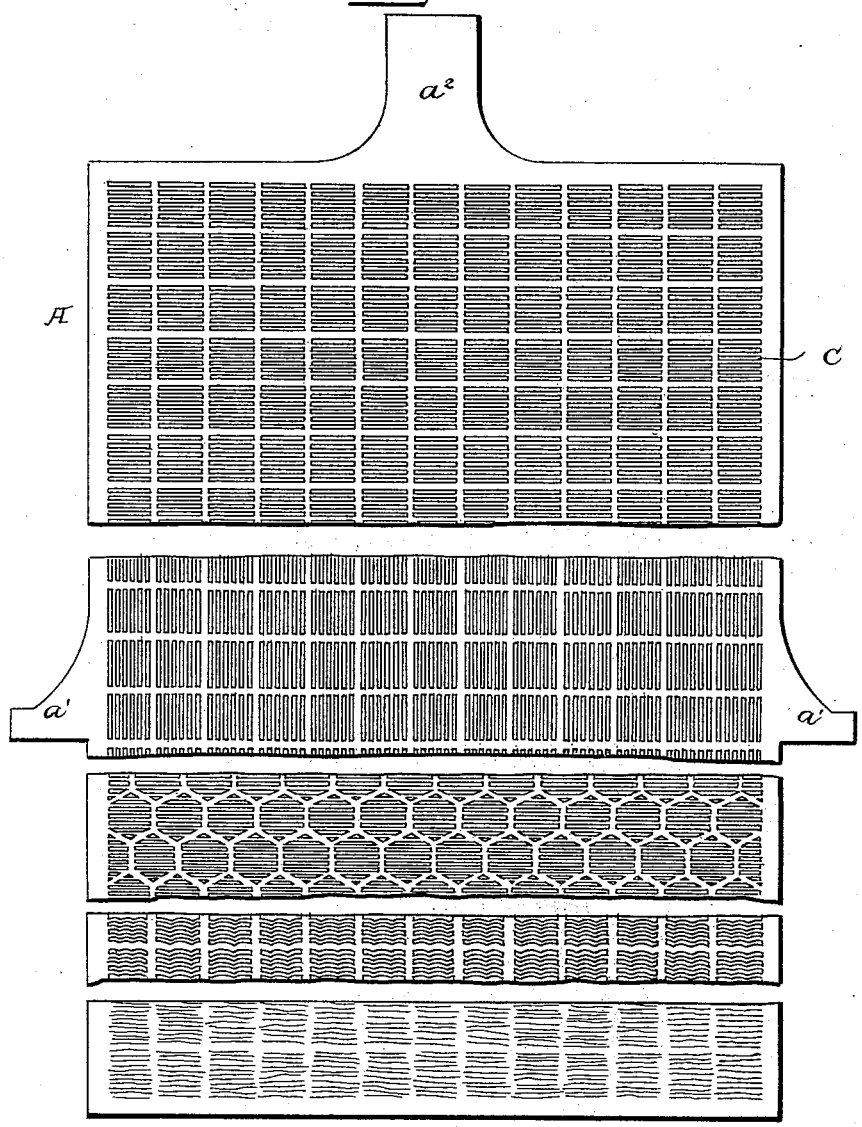
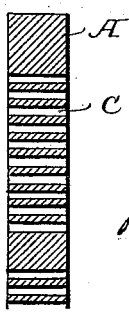

UNITED STATES PATENT OFFICE.

WILLIAM W. GRISCOM, OF HAVERFORD, PENNSYLVANIA.

MANUFACTURE OF SECONDARY-BATTERY ELECTRODES.

SPECIFICATION forming part of Letters Patent No. 487,834, dated December 13, 1892.

Application filed September 30, 1892. Serial No. 447,414. (No specimens.)

*To all whom it may concern:*

Be it known that I, WILLIAM W. GRISCOM, a citizen of the United States, residing at Haverford, in the county of Montgomery and State of Pennsylvania, have invented certain new and useful Improvements in the Manufacture of Secondary-Battery Electrodes, of which the following is a specification.

My invention relates to the manufacture of secondary-battery plates or elements; and it has for its object to produce an improved plate which shall be cheap of construction and which shall furnish the largest possible amount of active surface and which will have the longest possible life for a given weight.

To these ends my invention consists in the process, substantially as hereinafter set forth, for preparing the plates and in the plate having the features of construction and capable of the uses substantially such as are hereinafter more particularly pointed out.

Referring to the accompanying drawings, Figure 1 is a side view of a plate embodying my invention, the plate being shown with various forms of frames and corresponding strips, sheets, or bars; and Fig. 2 is an enlarged vertical section of a portion of the plate.

Heretofore in the manufacture of plates for secondary batteries two general methods have been followed—one, which is generally termed the "Planté" method, in which sheets of lead or other similar material are subjected directly to the action of an electric current in the process of "forming," the current being reversed at intervals until the surface of the lead plate presents a sufficient thickness of active material in the form of lead sponge or an oxide of lead, while the other type, generally known as the "Faure" method, consists in mechanically coating the lead or other plates with the active material, preferably in the form of a paint, paste, or cement. This latter type is the one which has been the more extensively used, and many and various attempts have been made to provide means whereby the active material may be securely held on the plate and at the same time be properly exposed to the action of the electrolyte, the plate as a rule being formed with perforations, openings, recesses, or depressions, into which the active material is forced or otherwise mechanically applied. The objections to both these types of plates, as well as the advantages, are well known to those skilled in the art and need not be recited; and it is one of the main objects of my present invention to provide a plate which shall possess the advantages of both systems and which shall be cheap of production and furnish a large surface of active material, and at the same time have a life practically equal to the sum of the lives of both of these types of plates.

It will be understood by those skilled in the art that my invention may be carried out and embodied in various forms and materials, and while I do not wish to limit myself to any particular form or material I will now proceed to describe what I have found to be a practical and effective embodiment of my invention.

Referring to the drawings, A represents a plate in the form of a grid, forming a group of frames of comparatively-thick material, and the plate may be provided with the lugs or supports $a'$, and the projection $a^2$ serving as a lug for connecting the plate to the electric circuit. The frames of the group are each provided with a series of thin sheets, strips, or bars C of metal inclosed within the framework and forming an integral part of the walls of the frame, and I have shown these sheets as being parallel to each other in various ways and as being relatively thin, leaving spaces between the sheets, strips, or bars of, say, one or two hundredths of an inch, more or less. These plates may be made of different materials; but I prefer to make them of lead, and preferably of what is known in the art as "forced" lead, rather than cast or rolled lead, inasmuch as the rolled lead has the disadvantage of possessing a hard or skin-like surface, and the cast lead has a more or less crystalline structure, while the forced lead presents a compact, homogeneous, and solid body, rendering it not only more durable, but capable of being treated and formed into a perfect and satisfactory electrode. Forced lead is usually made by forcing lead in a semi-fluid condition into or through dies or molds. It can also be made from lead in a molten condition, molded under pressure. The plate as thus constructed, is subjected to the action of some proper solution which produces a honeycombing or pitting of the surface, not only of the framework, but of the sheets, strips, or bars, contained within the framework, and this honeycombed surface receives a deposit of finely-divided lead or equivalent, either from the liquid in which it is treated or otherwise. The plate is then in condition to be "formed" for use in a battery, becoming practically a Planté plate, until, finally, through use, the sheets, strips, or bars become practically converted into active material and, swelling under this treatment, fill the spaces or openings, and then the plate becomes similar to a Faure plate, except that the active material has not been mechanically applied. In this way the plate practically combines the life of a Planté and of a Faure type of plate.

While various solutions may be used in carrying out my invention, I prefer to submit the plate to the action of an alkaline solution, in which it is boiled until the surface of the plate becomes honeycombed to a depth, say, of one two-hundredth of an inch, more or less, and within these honeycombings and on the surface the active material or material to become active is deposited, either from the solution itself or otherwise. The active material is preferably in the form of finely-divided lead, and by this I mean metallic lead or any of its oxides or salts in a state of fine subdivision, forming a coherent mass, the particles of finely-divided lead cohering together, as well as adhering to the plate. For example, I take an alkaline solution containing about two per cent. ammonium nitrate, aqueous solution, and immerse the plate therein, when the solution is boiled for a greater or less time, depending upon many conditions, as the size and character of the plate and the strength and materials of the solution, and when thus treated the surface of the plate becomes thoroughly honeycombed or pitted to a greater or less depth, and within these honeycombs is deposited the finely-divided lead. The plate thus treated may be then removed from the solution and dried and subjected to the forming process by being immersed in an electrolyte solution, preferably consisting of dilute sulphuric acid, and connected to the positive pole of an electric circuit, and the finely-divided lead is converted into a peroxide by the action of the electric current, when the plate is ready to be used as a positive plate of a secondary battery. This positive plate can be converted into a negative plate in the well-known way. These plates thus treated may constitute the positive and negative plates of a storage-battery analogous to the Planté type, and the battery can be used for useful purposes. In the course of such use the thin sheets, strips, or bars of lead are practically converted into active material, and these sheets, strips, or bars become a substantially-compact mass, swelling under the treatment, filling the spaces, and causing the plate to be in a condition analogous to the well-known Faure-Swan type of plate. Thus an additional life is given to the plate after the active material formed from the sheets, strips, or bars would have become too much disintegrated to be effective in a Planté battery. It is further observed that additional life may be given to the plate by supplying it initially with active material mechanically applied, and it can be thus used until the mechanically-applied material has fallen out, at which time the plate will begin to operate as a Planté plate, and so continue until through disintegration the sheets, strips, or bars fill the framework with active material held in place as described, and then it begins a new life as a modified form, resembling the Faure-Swan plate.

It may be remarked that the masses of active material formed out of the disintegrated sheets, strips, or bars are held in place not only by being confined by the heavier framework, but there will remain for a long time small conducting-filaments of lead, remnants of the disintegrated sheets, strips, or bars, extending from the framework into the mass, which tend to retain the active material in place, and also to maintain a large contact-surface between the frame of the plate and the active material. Another advantage is that the plate thus formed is less liable to buckle, owing to the fact that the sheets, strips, or bars have an opportunity to bend or buckle independently without producing any material strain on the framework of the plate as a body, and in some instances this result may be still further provided for by corrugating the sheets, strips, or bars, as indicated in the drawings. It will thus be seen that I produce an exceedingly-effective plate, having great economy of production, and one which is capable of an exceedingly-long life. It may commence its life as a Faure-Swan plate pure and simple, and after the active material falls out, as is usual with Faure-Swan plates, it will begin a new life as a Planté element, and after disintegration has proceeded so far as to make it useless as an ordinary Planté plate it will have still another lease of life as a species of Faure-Swan plate, except that the active material in this last phase of its existence will not have been applied mechanically.

If it be preferred to omit the first phase of existence, as above described—to wit, the Faure-Swan type—which has the disadvantage of shedding its active material, causing short circuits, and filling the bottom of the jar with a conducting-mud, which renders the battery impracticable for certain purposes, my new plate may commence its life as one of a Planté type, and after disintegration has proceeded, as above described, it becomes converted into a modified form of Faure-Swan plate, from which it differs, mainly, in that its active material is not mechanically applied and in that the mass of active material is permeated by conducting-filaments.

What I claim is—

1. The process, substantially as hereinbefore set forth, of preparing secondary-battery plates or elements, which consists in subjecting a plate to the action of an alkaline solution, thereby first producing honey-combs in the surface of the plate and subsequently chemically depositing thereon active material or material to become active, and then forming the plate electrolytically in the usual way.

2. The process, substantially as hereinbefore set forth, of preparing secondary-battery plates or elements, which consists in subjecting a lead plate to the action of a hot alkaline solution, thereby first producing honey-combs therein and subsequently chemically depositing active material or material to become active in the honey-combs, and then forming the plate electrolytically in the usual way.

3. The process, substantially as hereinbefore set forth, of preparing secondary-battery plates or elements, which consists in subjecting a lead plate having spaces filled with thin sheets, strips, or bars to the action of a hot solution of nitrate of ammonia, thereby first producing honey-combs in the surface of the plate and subsequently chemically depositing in said honey-combs finely-divided lead, and then forming the plate electrolytically in the usual way.

4. A lead plate or grid consisting of a group of conducting and supporting walls or frames filled with thin integral sheets, strips, or bars with their broad faces opposed to each other and which are separated from one another by narrow interstices, said group being in turn surrounded by a frame forming the boundary of the plate, substantially as described.

5. A lead plate or grid consisting of a group of conducting and supporting frames filled with thin integral sheets, strips, or bars, which are separated from one another by narrow interstices of such a width as to be filled when the sheets, strips, or bars are sufficiently converted into active material, substantially as described.

6. A lead plate or grid consisting of a group of conducting and supporting frames filled with thin integral sheets, strips, or bars, which are separated from one another by narrow interstices of such a width as to be filled when the sheets, strips, or bars are sufficiently converted into active material, the whole being composed of forced lead, substantially as described.

In testimony whereof I have signed my name to this specification in the presence of two subscribing witnesses.

WILLIAM W. GRISCOM.

Witnesses:
JOHN RODGERS,
ROBERT McA. LLOYD.